Aug. 27, 1940.  R. W. WAGNER  2,212,677
SWEEPER
Filed April 25, 1938  3 Sheets-Sheet 1
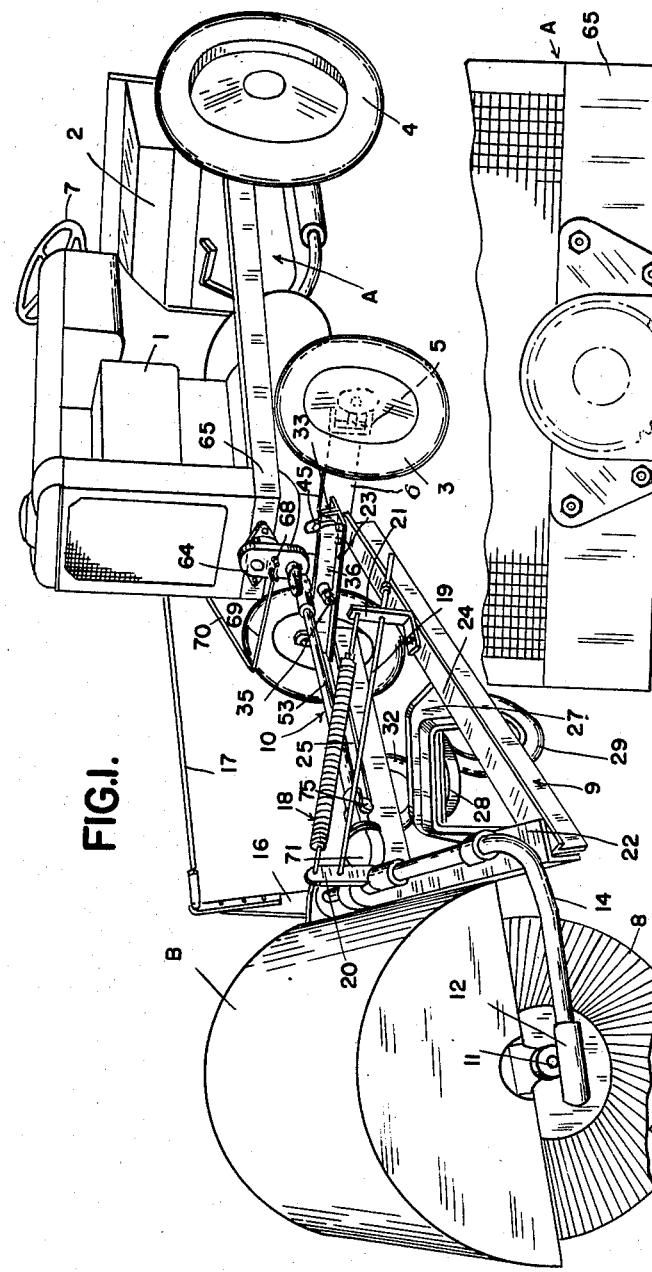
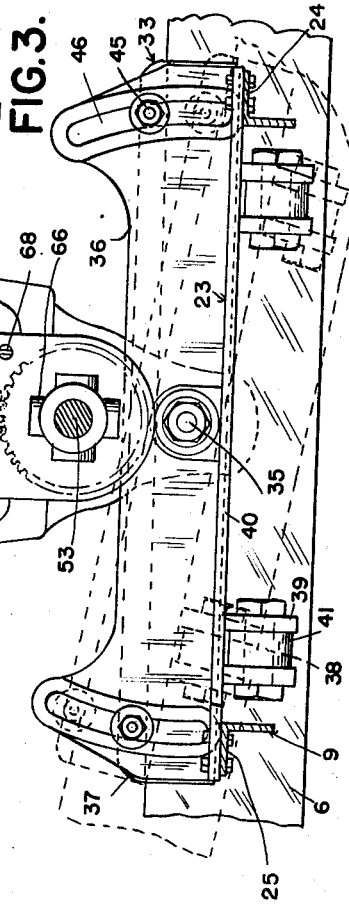
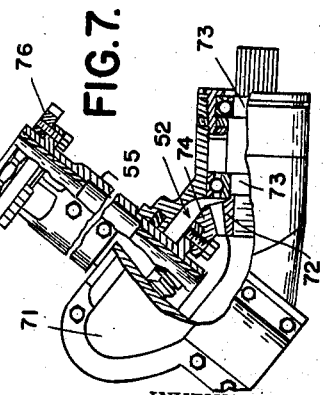
INVENTOR
ROBERT W. WAGNER
BY
ATTORNEYS Aug. 27, 1940.   R. W. WAGNER   2,212,677
SWEEPER
Filed April 25, 1938   3 Sheets-Sheet 2
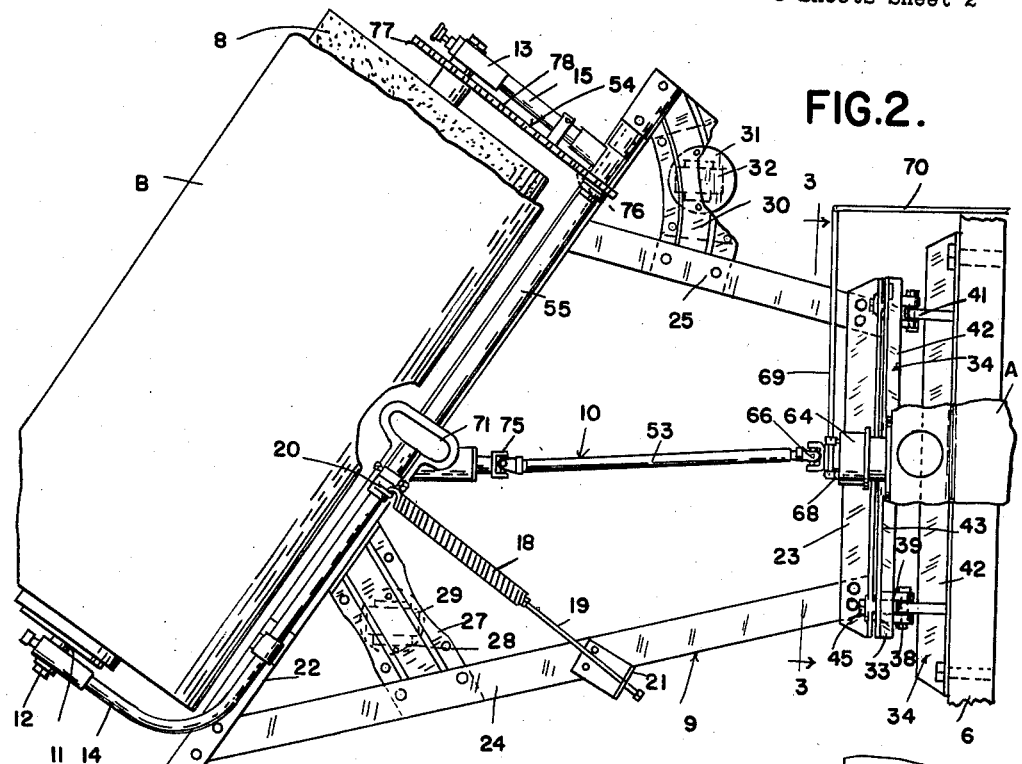
FIG.2.
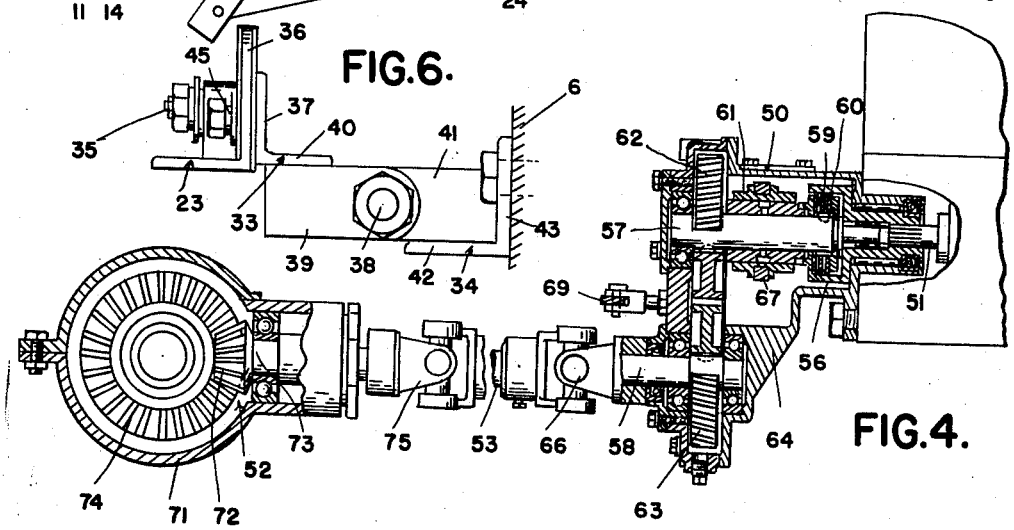
FIG.6.
FIG.4.
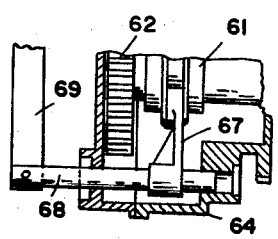
FIG.5.
INVENTOR
ROBERT W. WAGNER
BY
ATTORNEYS Aug. 27, 1940.    R. W. WAGNER    2,212,677
SWEEPER
Filed April 25, 1938    3 Sheets-Sheet 3
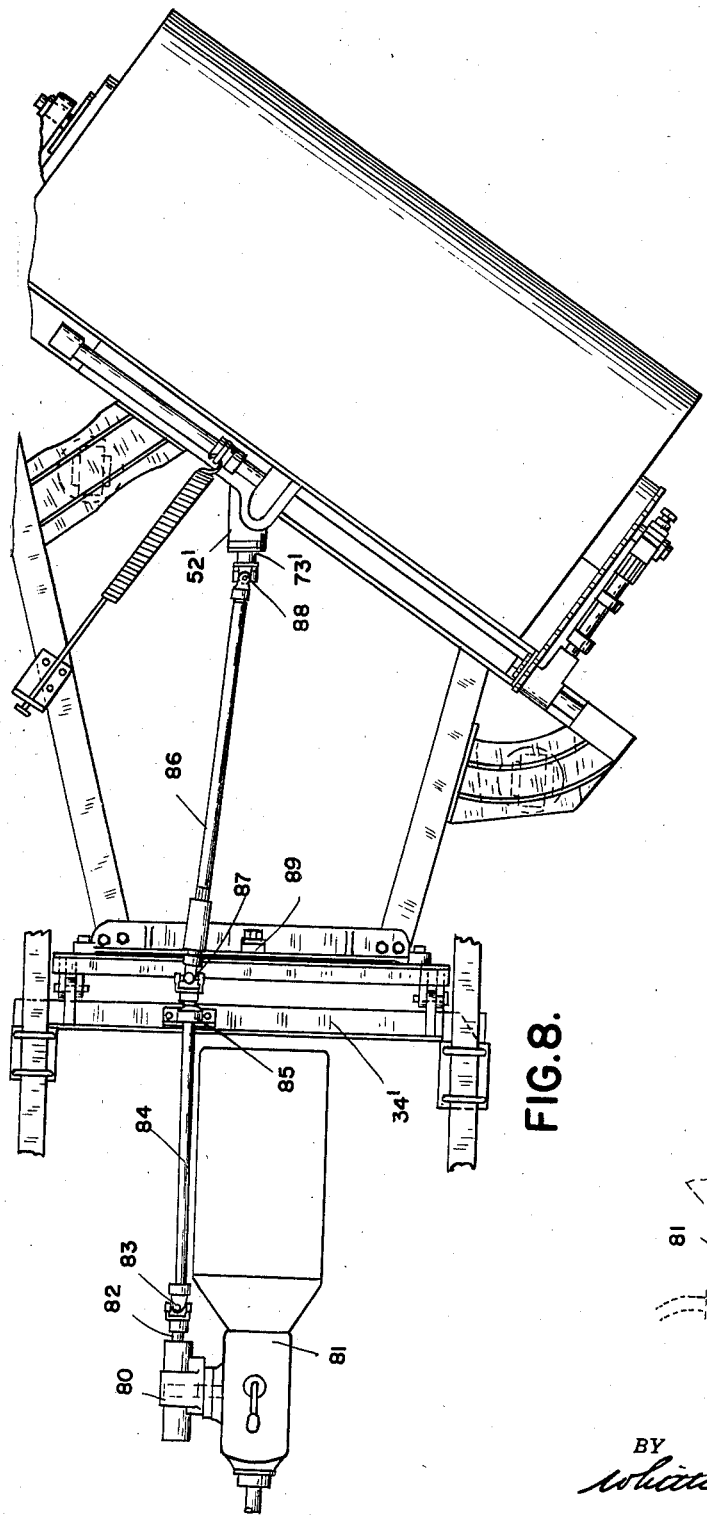
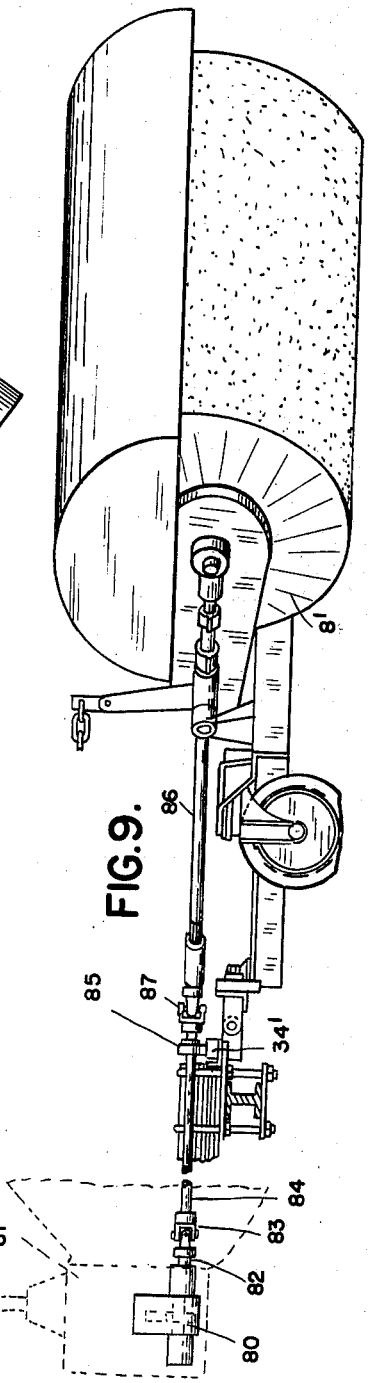
INVENTOR
ROBERT W. WAGNER
BY
ATTORNEYS Patented Aug. 27, 1940

2,212,677

UNITED STATES PATENT OFFICE 2,212,677

SWEEPER

Robert W. Wagner, Detroit, Mich., assignor to Detroit Harvester Company, Detroit, Mich., a corporation of Michigan Application April 25, 1938, Serial No. 204,154

3 Claims. (Cl. 15—82)

This invention relates generally to power driven sweepers and refers more particularly to street sweepers that are coupled to tractors, trucks and the like and are driven from the power plants theroef.

One of the essential objects of the invention is to provide a tractor-sweeper combination of this type wherein the coupling between the parts is such that the axle of the tractor may move up and down or tilt, for example, when traveling over a rough or uneven road, without tilting the sweeper. Thus, the sweeper may move horizontally while the front wheels of the tractor move vertically.

Another object is to provide a combination of the type mentioned wherein the drive from the tractor to the sweeper is likewise unaffected by the vertical movement of the front wheels of the tractor. In other words, the sweeper may be driven constantly from the tractor regardless of the knee action of the front wheels of the tractor.

Another object is to provide a sturdy construction that may be readily manufactured and that is efficient in operation.

Other objects, advantages and novel details of construction of this invention will be made more apparent as this description proceeds, especially when considered in connection with the accompanying drawings, wherein:

Figure 1 is a fragmentary perspective view of a tractor-sweeper combination embodying my invention;

Figure 2 is a fragmentary top plan view of the sweeper and of the forward end of the tractor illustrated in Figure 1;

Figure 3 is a cross sectional view taken substantially on the line 3—3 of Figure 2;

Figure 4 is a fragmentary side elevation of the drive between the tractor and sweeper, showing parts broken away and in section;

Figure 5 is a fragmentary sectional view of the clutch adjusting mechanism;

Figure 6 is a side elevation of the universal connection between the tractor and sweeper;

Figure 7 is a fragmentary top plan view of the sweeper gear housing and associated parts;

Figure 8 is a fragmentary top plan view of a slight modification;

Figure 9 is a side elevation of the structure illustrated in Figure 8.

Referring now to the drawings, A is the tractor and B is the sweeper of a combination embodying my invention.

As shown, the tractor A is arranged as a pusher in rear of the sweeper B and has an internal combustion engine 1 and driver's compartment 2 arranged in tandem and mounted upon front and rear ground wheels 3 and 4, respectively. The engine 1 forming the power plant of the tractor may be any conventional design and may be operatively connected in any suitable manner to the rear ground wheels 4. The front wheels 3 are carried by spindles 5 projecting from an axle 6 and are operatively connected to a steering wheel 7.

The sweeper B has a rotating ground-engaging brush 8, a supporting frame 9, and drive mechanism 10. Preferably the brush 8 is inclined relative to the longitudinal median line of the tractor and has a shaft 11 journaled in suitable bearings 12 and 13 carried by rearwardly extending arms 14 and 15, respectively, rockably mounted upon the frame 9. Any suitable means such as the lever 16 fixed to the arm 15 and operable by a rod 17 leading to the driver's compartment 2 may be used for rocking the arms 14 and 15 on the frame 9 to raise and lower the brush 8 relative to the ground.

18 is a counterbalancing spring for the brush 8 and 19 is a control rod for said spring. As shown, the spring 18 and rod 19 are arranged one above the other and are carried by uprights 20 and 21 fixed respectively to the arm 14 and frame 9.

The frame 9 is formed from heavy gauge angle irons and comprises front and rear crossbars 22 and 23, respectively, and the connecting longitudinal bars 24 and 25. Preferably the front crossbar 22 is substantially parallel to the shaft 11 of the brush, while the rear crossbar 23 is parallel to the front axle 6 of the tractor. The longitudinal bars 24 and 25 are beneath and rigidly secured to the front and rear crossbars 22 and 23. 27 is a diagonal brace rigid with the bars 22 and 24 of the frame and secured to the attaching plate 28 of a caster wheel 29, and 30 is a curved brace rigid with the bars 22 and 25 and secured to the attaching plate 31 of a caster wheel 32.

To permit the axle 6 of the tractor to move up and down or tilt without tilting the brush 8, I have provided an angle iron 33 that is pivotally connected to the rear crossbar 23 of the frame and to an angle iron 34 rigid with the axle 6 of the tractor. As shown, the pivotal connection between the angle iron 33 and crossbar 23 comprises a longitudinally extending pin 35 extending through the upright parts 36 and 37 respectively of the crossbar 23 and angle iron 33 substantially midway their ends, while the pivotal connection between the angle irons 33 and 34 comprises a pair of laterally spaced transversely extending pins 38 that engage aligned holes in rearwardly extending arms 39 fixed to the base 40 of angle iron 33 and to the forwardly extending arms 41 fixed to the base 42 and upright part 43 of the angle iron 34. At opposite ends of the angle iron 33 are forwardly projecting bolts 45 that engage vertically extending curved slots 46 in the upright part 36 of the crossbar 23. Thus, in effect, a universal joint is provided between the tractor A and sweeper B.

The drive mechanism for the sweeper comprises a clutch assembly 50 at the forward end of the crank shaft 51 of the tractor, gearing 52 on the sweeper, an intermediate shaft 53, a sprocket and chain sub-assembly 54, and a shaft 55 intermediate the gearing 52 and sub-assembly 54. As shown, the clutch assembly 50 includes a collar 56, parallel shafts 57 and 58, cooperating clutching disks 59 and 60, sliding collar 61, and meshing gears 62 and 63 respectively on said shafts 57 and 58. Preferably the collar 56 is splined upon the forward end of the crank shaft 51 and is journaled in a suitable housing 64 bolted to the frame 65 of the tractor. The shafts 57 and 58 are also journaled in the housing 64, the shaft 57 being entirely within said housing in axial alignment with the crank shaft 51, and the shaft 58 projecting through said housing and being connected by a suitable universal joint 66 to the shaft 53. Any suitable means such as the shifter fork 67 engaging the sliding collar 61 and operable by a shaft 68, lever 69 and rod 70 from the driver's compartment may be used to operate the clutch to connect and disconnect the shafts 57 and 51.

The gearing 52 is within a housing 71 rigid with the frame 9 of the sweeper and comprises a gear 72 fixed to a shaft 73 journaled in the casing 71, and a gear 74 meshing with the gear 72 and fixed to the shaft 55. A universal joint 75 is used to connect the shaft 73 to the shaft 53. The sub-assembly 54 comprises sprocket wheels 76 and 77 respectively fixed to the shafts 55 and 51, and a chain 78 trained about said sprocket wheels. Thus, while the shafts 57 and 51 are connected between clutch 50, the brush 8 will be driven from the internal combustion engine 1 of the tractor.

In Figures 8 and 9 I have illustrated a slight modification in which the brush 8' of the sweeper is driven from a power take-off 80 at one side of an internal combustion engine 81 of a truck. In this construction a shaft 82 operated by the power take-off is connected by a universal joint 83 to a shaft 84 journaled in a bearing 85 on the angle iron 34'. A shaft 86 is connected by a universal joint 87 to the shaft 84 and by another universal joint 88 to the shaft 73' of the gear assembly 52'. Preferably the gear assembly 52' and drive therefrom to the rotary brush 8' is the same as in Figure 1. Likewise, the construction of sweeper and universal connection 89 between said sweeper and truck is substantially the same as in Figure 1.

Thus, in both assemblies, i. e., the tractor-sweeper combination in Figure 1 and the truck-sweeper combination in Figure 8, the sweeper has a universal joint with the power driven unit of the combination to compensate for knee action of the front wheels of said unit, and the drive mechanism for the rotary brush is constructed so as to operate constantly from the power driven unit regardless of said knee action.

What I claim as my invention is:

1. A sweeper attachment for the forward end of a four-wheel tractor, including a rigid frame having a rear crossbar and adapted to carry a ground-engaging brush at its forward end, a cross member in close substantially parallel relation to said rear crossbar and adapted to be rigidly secured in substantially surface-to-surface relation to the front axle of a four-wheel tractor, and a connection between the frame and cross member permitting the brush to remain in engagement with the ground during tilting and vertical movement to a limited extent of the front wheels of the tractor, including a second cross member between and substantially parallel to the first mentioned cross member and the rear crossbar of the frame, a pivotal connection between the second mentioned cross member and the rear crossbar of the frame, said pivotal connection being at substantially the center of the second mentioned cross member so as to be substantially in alignment with the longitudinal center line of the tractor, and hinge connections between the first and second mentioned cross members adjacent opposite ends thereof, the rear crossbar of the frame having vertically extending curved slots therein substantially concentric with the pivotal connection aforesaid, and connections between the second mentioned cross member and the rear crossbar of the frame including projections on the second mentioned cross member engaging said slots.

2. A sweeper attachment for the forward end of a four-wheel tractor, including a rigid frame having a rear crossbar and adapted to carry a ground-engaging brush at its forward end, a cross member in close substantially parallel relation to said rear crossbar and adapted to be rigidly secured in substantially surface-to-surface relation to the front axle of a four-wheel tractor, and a connection between the frame and cross member permitting the brush to remain in engagement with the ground during tilting and vertical movement to a limited extent of the front wheels of the tractor, including a second cross member between and substantially parallel to the first mentioned cross member and the rear crossbar of the frame, a pivotal connection between the crossbar of the frame and the second mentioned cross member including a pivot pin extending through the crossbar and second mentioned cross member substantially midway their ends, hinge connections between the first and second mentioned cross members including hinges secured to said cross members adjacent their opposite ends, the rear crossbar of the frame having vertically extending curved slots therein substantially concentric with the pivot pin, and slidable connections between the second mentioned cross member and the rear crossbar of the frame including bolts projecting from the second mentioned cross member and engaging said curved slots.

3. A sweeper attachment for the forward end of a four-wheel tractor, comprising a rigid frame adapted to carry a ground-engaging brush, a structural member adjacent said frame and adapted to be rigidly secured in substantially surface-to-surface relation to the front axle of a four-wheel tractor, and a connection between said frame and said structural member including a second structural member between the first mentioned structural member and said frame, a pivotal connection between the second mentioned structural member and the frame, hinge connections between the two structural members at substantially diametrically opposite sides of the pivotal connection aforesaid, the frame having vertically extending curved slots therein substantially concentric with the pivotal connection, and sliding connections between the second mentioned structural member and the frame including means within and movable longitudinally of said curved slots.

ROBERT W. WAGNER.